United States Patent
Brandwine et al.

(10) Patent No.: US 9,450,762 B2
(45) Date of Patent: Sep. 20, 2016

(54) SECURING RESULTS OF PRIVILEGED COMPUTING OPERATIONS

(71) Applicant: Amazon Technologies, Inc., Reno, NV (US)

(72) Inventors: Eric Jason Brandwine, Haymarket, VA (US); Matthew Shawn Wilson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 516 days.

(21) Appl. No.: 13/746,780

(22) Filed: Jan. 22, 2013

(65) Prior Publication Data

US 2014/0208097 A1    Jul. 24, 2014

(51) Int. Cl.
| | | |
|---|---|---|
| *G06F 21/00* | (2013.01) | |
| *H04L 9/32* | (2006.01) | |
| *G06F 21/33* | (2013.01) | |
| *G06F 21/44* | (2013.01) | |
| *G06F 21/60* | (2013.01) | |
| *G06F 21/62* | (2013.01) | |
| *G06F 21/53* | (2013.01) | |
| *G06F 9/455* | (2006.01) | |

(52) U.S. Cl.
CPC ............. *H04L 9/3263* (2013.01); *G06F 21/33* (2013.01); *G06F 21/44* (2013.01); *G06F 21/606* (2013.01); *G06F 21/629* (2013.01); *G06F 9/45558* (2013.01); *G06F 21/53* (2013.01); *G06F 2221/2107* (2013.01)

(58) Field of Classification Search
CPC ........ G06F 21/53; G06F 21/33; G06F 21/62; G06F 21/606; G06F 9/45558; H04L 9/0891; H04L 9/3263
USPC ................. 713/155, 156, 164, 168; 726/3, 5
See application file for complete search history.

(56) References Cited

U.S. PATENT DOCUMENTS

| | | | |
|---|---|---|---|
| 5,410,602 A | * | 4/1995 | Finkelstein ........... H04L 9/0822 380/270 |
| 6,704,871 B1 | | 3/2004 | Kaplan et al. |
| 7,123,721 B2 | | 10/2006 | Panjwani et al. |
| 7,272,832 B2 | | 9/2007 | Gardner |
| 8,208,637 B2 | | 6/2012 | Ellison |
| 8,295,484 B2 | | 10/2012 | Buer et al. |
| 8,336,079 B2 | | 12/2012 | Budko et al. |

(Continued)

OTHER PUBLICATIONS

Tsutomu Nomoto et al., Using a Hypervisor to Migrate Running Operating Systems to Secure Virtual Machines, Jul. 19-23, 2010, IEEE, pp. 37-46.*

(Continued)

*Primary Examiner* — Kari Schmidt
*Assistant Examiner* — Fahimeh Mohammadi
(74) *Attorney, Agent, or Firm* — Hogan Lovells US LLP (57) ABSTRACT

A formalized set of interfaces (e.g., application programming interfaces (APIs)) is described, that uses a security scheme, such as asymmetric (or symmetric) cryptography, in order to secure the results of privileged operations on systems such as the operating system (OS) kernel and/or the hypervisor. The interface allows a public key to be included into a request to perform a privileged operation on a hypervisor and/or kernel. The kernel and/or hypervisor use the key included in the request to encrypt the results of the privileged operation. In some embodiments, the request itself can also be encrypted, such that any intermediate parties are not able to read the parameters and other information of the request.

21 Claims, 9 Drawing Sheets

(56) References Cited

U.S. PATENT DOCUMENTS

| | | | |
|---|---|---|---|
| 8,353,015 | B2 | 1/2013 | Carpenter et al. |
| 8,364,638 | B2 | 1/2013 | Nickolov et al. |
| 8,429,630 | B2 | 4/2013 | Nickolov et al. |
| 8,473,557 | B2 | 6/2013 | Ramakrishnan et al. |
| 8,478,725 | B2 | 7/2013 | Mashtizadeh et al. |
| 8,494,170 | B2* | 7/2013 | Kahler .................. H04L 9/0825 380/277 |
| 8,522,035 | B2 | 8/2013 | Sherkin et al. |
| 8,539,587 | B2 | 9/2013 | Proudler et al. |
| 8,595,723 | B2 | 11/2013 | Garrett et al. |
| 8,688,984 | B2 | 4/2014 | Rajkumar et al. |
| 8,738,932 | B2 | 5/2014 | Lee et al. |
| 8,800,050 | B2 | 8/2014 | Ray |
| 8,880,667 | B2 | 11/2014 | Novak et al. |
| 2004/0161110 | A1* | 8/2004 | Kanai .................. H04L 63/0442 380/279 |
| 2009/0293057 | A1* | 11/2009 | Larkin .................... G06F 9/468 718/1 |
| 2010/0223611 | A1* | 9/2010 | Mahalingam ....... G06F 9/45537 718/1 |
| 2010/0257602 | A1 | 10/2010 | Kettler et al. |
| 2011/0202917 | A1* | 8/2011 | Laor .......................... G06F 8/65 718/1 |
| 2011/0208908 | A1* | 8/2011 | Chou .................. G06F 11/1662 711/112 |
| 2012/0102335 | A1* | 4/2012 | Goodman ............. H04L 9/0822 713/189 |
| 2012/0124675 | A1* | 5/2012 | Lee .......................... G06F 21/10 726/28 |
| 2012/0324446 | A1 | 12/2012 | Fries et al. |
| 2013/0013921 | A1* | 1/2013 | Bhathena .............. H04L 9/0825 713/168 |
| 2013/0097356 | A1* | 4/2013 | Dang ...................... G06F 9/455 711/6 |
| 2013/0151848 | A1 | 6/2013 | Baumann et al. |
| 2013/0198512 | A1* | 8/2013 | Rubin .................. H04L 63/0823 713/157 |
| 2014/0040997 | A1* | 2/2014 | Anantharaju ........... G06F 21/53 726/5 |
| 2014/0208096 | A1 | 7/2014 | Brandwine et al. |
| 2014/0208111 | A1 | 7/2014 | Brandwine et al. |

OTHER PUBLICATIONS

Dong-Guen Kim et al., Design of the Operating System Virtualization on L4 Microkernel, Sep. 2-4, 2008, IEEE, pp. 307-310.*
Chen Wen-Zhi, Cerberus: A Novel Hypervisor to Provide Trusted and Isolated Code Execution, Aug. 7-8, 2010, IEEE, pp. 330-333.*
Abhinav Srivastava et al., Efficient Protection of Kernel Data Structures via Object Partitioning, Dec. 2012, ACM, pp. 429-438.*
PCT International Preliminary Report on Patentability for PCT/US2014/012604, date of mailing Aug. 6, 2015, 7 pages.
PCT International Preliminary Report on Patentability for PCT/US2014/012605, date of mailing Aug. 6, 2015, 6 pages.
PCT International Preliminary Report on Patentability for PCT/US2014/012606, date of mailing Aug. 6, 2015, 7 pages.
Written Opinion from Intellectual Property Office of Singapore for application No. 11201505652U dated Oct. 10, 2015, 11 pages.
Written Opinion from Intellectual Property Office of Singapore for application No. 11201505651W dated Sep. 29, 2015, 11 pages.
USPTO Non-Final Office Action dated Oct. 23, 2014 for U.S. Appl. No. 13/746,702.
USPTO Final Office Action dated May 13, 2015 for U.S. Appl. No. 13/746,702.
USPTO Non-Final Office Action dated May 21, 2015 for U.S. Appl. No. 13/746,737.
PCT International Search Report and Written Opinion dated Jun. 16, 2014 for International Application No. PCT/US 14/12605.
PCT International Search Report and Written Opinion dated Jun. 16, 2014 for International Application No. PCT/US 14/12606.
PCT International Search Report and Written Opinion dated Jun. 13, 2014 for International Application No. PCT/US 14/12604.

* cited by examiner

SECURING RESULTS OF PRIVILEGED COMPUTING OPERATIONS

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

Many cloud computing providers utilize virtualization to allow multiple users to share the underlying hardware and/or software resources. Virtualization can allow computing servers, storage device or other resources to be partitioned into multiple isolated instances (e.g., virtual machines) that are each owned by a particular user. These virtual machines are often hosted using a hypervisor running on a host computing device. In this context, the hypervisor and the guest operating system kernel act as security enforcement mechanisms. For example, the hypervisor typically controls the various virtual machines on the host and the kernel controls the various processes on the virtual machine. For security reasons, both the hypervisor and the kernel are made difficult to modify or alter. Occasionally, however, it may be desirable to modify the code of the hypervisor or the kernel at runtime for reasons, such as to apply software patches, perform security monitoring and the like.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for securing data, such as the results obtained by performing operations in privileged systems (e.g., an operating system kernel, hypervisor etc.). In particular, various embodiments utilize a security scheme, such as asymmetric (or symmetric) cryptography, to secure data by including a key (e.g., public key) into a request to perform a privileged operation on a hypervisor and/or kernel. The kernel and/or hypervisor can use the key included in the request to encrypt the results of the privileged operation. In some embodiments, the request itself can also be encrypted or signed, such that any intermediate parties are not able to read the parameters and other information of the request unless those parties are authorized to view the request and/or have a copy of the key or other mechanism used to decrypt the request or otherwise tamper with the request. In accordance with an embodiment, the request is submitted to the kernel/hypervisor using a formalized set of interfaces (e.g., application programming interfaces (APIs)) that enables code to be securely added to and/or modified on the operating system (OS) kernel and/or the hypervisor. These interfaces can be invoked to perform security monitoring, forensic capture, and/or patch software systems at runtime. In various embodiments, the results of an API request are encrypted using a public key that was included as a parameter in the API request.

In various embodiments, the security scheme described herein can be utilized in a multi-tenant shared resource environment (e.g., cloud computing environment) when performing privileged operations in hypervisors and/or OS kernels of host computing devices. Conventionally, in this type of environment, host computing devices utilize virtualization technology to provision one or more virtual machine instances that are associated with different customers of a service provider (e.g., cloud computing provider). These virtual machine instances are hosted on the computing device using a hypervisor (or other virtualization technology) and each virtual machine instance may contain a guest operating system, including a kernel, device drivers and other OS components. The host computing devices and other physical resources to host the virtual machines are usually provided by the service provider and reside in resource centers, such as a data centers, server farms, content delivery network (CDNs) points-of-presence (POPs) and the like.

In such multi-tenant shared resource environments, it is often useful to perform introspection and/or other data gathering among the various host machines and virtual machine instances operating thereon. For example, there may be software bugs or other anomalies that cause a hypervisor or a kernel to enter an abnormal state. In some cases, this abnormal state may be a latent failure, where if nothing is done to resolve the situation, the host device or the virtual machine instance will eventually fail. Detecting or resolving some of these errors can require examining the memory of a running hypervisor and/or kernel of the host device. However, these components (e.g., hypervisor/kernel) usually contain very sensitive information, which is important to keep secure and private to the owner of the resource.

In various embodiments, to secure access to such sensitive information, the application programming interfaces (APIs) described herein can be used to submit a request to perform a privileged operation (e.g., retrieve sensitive data, perform an update, etc.) on the hypervisor and/or the kernel of the virtual machine. To prevent unauthorized parties (e.g., data technicians, etc.) from gaining access to the request, the request can be signed and/or encrypted. In addition, the request can include (e.g., as a parameter) a public key that can be used by the hypervisor/kernel to encrypt any results of the request. Thus, a party having the private key that corresponds to the public key can decrypt the results of the request. Consequently, any intermediate parties (e.g., data technicians) that may handle or intercept the request would be unable to read the request or decipher the results of the request. If the request is signed the requester's public key is a parameter to the request and is covered in the signature, the public key cannot be removed or replaced by anyone that handles the request as an intermediary.

In some embodiments, the party having the private key capable of decrypting the results is the party that originally instructed an intermediary party to carry out the request and collect the results. For example, an administrator may instruct a technician to invoke the request and collect the results, where the administrator owns the private key capable of decrypting the results (i.e., technician would not be able to read the results). In an alternative embodiment, the party having the private key is a different party from the party that authorized the intermediary party to collect the results. For example, an administrator of the service provider can authorize a technician to issue the requests and collect the results. Another party (e.g., investigator) may be in possession of the private key used to decrypt the results. The technician can issue the requests, but the technician would not be able to read the results because the technician does not possess the private key for decrypting the results. Similarly, in this example, the administrator would not be authorized to execute the request, nor read the results of that request. Various other examples of such key ownership are possible within the scope of the various embodiments.

In some embodiments, this security scheme could be used to collect sensitive data about various virtual machine instances running in the service provider's network. In one embodiment, a central trusted service can generate requests for all of the host devices in the resource center, and the central service can include its public key in these requests. An untrusted component (e.g., an intermediary party) may then distribute these requests to the host devices, and issue the requests locally. In some embodiments, the same untrusted component can collect the results and receive them for delivery to the central service. The results can then be decrypted once they arrive at the central service.

In one embodiment, a service provider can utilize the security scheme to perform speculative data collection, such as to detect fraud or abuse cases, without violating customer trust. For example, a fraud investigator can flag a particular host machine as suspicious and initiate monitoring of the machine. When monitoring is started, the request can cause the hypervisor to start collecting detailed kernel or hypervisor information (i.e. results). The results can then be encrypted with the public key included in the request. Subsequently, an authenticated party in possession of the private key can decrypt the gathered data and perform analysis to determine fraud, abuse of service and the like.

In another embodiment, the security scheme can be utilized to implement a continuous health checking service. For example, when a particular host machine is exhibiting performance anomalies, the health service can submit requests to capture snapshots of kernel/hypervisor memory which may include sensitive customer data and encrypt the results of the operation. Because the results of the requests are encrypted, it is less likely that the information will be improperly accessed. In some embodiments, the health service can also perform random sampling and/or profiling the host machine or virtual machine instance. For example, the service may obtain a baseline of performance data and later detect anomalies based at least in part on that baseline. In various embodiments, the profiles may be customer based or machine based, may include absolute thresholds, or may be randomized (e.g., periodically a number of host machines are randomly selected for snapshot).

In various embodiments, the decryption key (e.g., private key) is stored in a secure location. For example, the key may be maintained by the security team of the service provider. As such, the person collecting the data and the person who can read the results of the collection are distinct parties and may not even have access to the private key. In one embodiment, the key to which the data is encrypted (e.g., public key) is part of the request. In an alternative embodiment, there may be a single key that all host machines trust and this key can be compiled into the kernel. In another embodiment, there may be a trusted certificate authority (CA), where each host machine fetches a certificate from the trusted CA.

In some embodiments, the customer may specify the key and instruct the service provider to use the key to provide the customer with an encrypted imaged dump of the customer's VM instance's memory. A request to retrieve a dump of the memory can be submitted to the host computing device (e.g., kernel or hypervisor of the host computing device) using the API, such as a Web Services API. In one embodiment, the API request can include the customer-specified key. Before the kernel or hypervisor of the host computing device communicates the dump of memory out of the host computing device, the dump of memory is encrypted using the customer-specified key.

Figure 1:
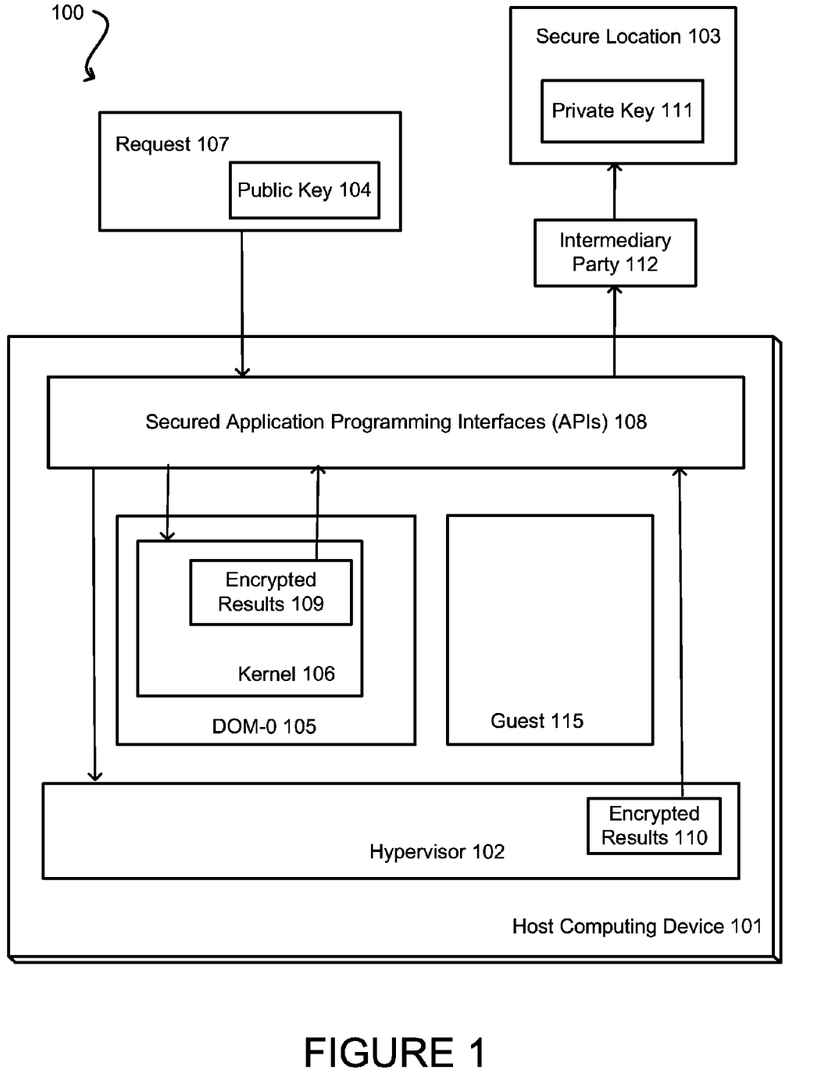
FIG. 1 illustrates an example of securing the results of a privileged operation on a hypervisor or kernel, in accordance with various embodiments.

FIG. 1 illustrates an example 100 of securing the results of a privileged operation on a hypervisor or kernel, in accordance with various embodiments. In the illustrated embodiment, a request 107 can be submitted using a set of application programming interfaces (APIs) 108 to perform a privileged operation on a kernel 106 or hypervisor 102 of a host computing device 101. In this embodiment, the host computing device 101 includes a virtualization layer illustrated as a combination of a hypervisor 102 and a privileged domain (DOM-0) 105. The Dom0 105 and hypervisor 102 can in turn effect a plurality of guests, such as guest 115. The guests can be virtual machine instances, each having their own respective operating system (OS), kernel, device drivers, scheduler and the like. Dom-0 105 is used to launch and manage the other guest domains on the host computing device 101. While the virtualization layer is illustrated as separate components in this figure, other implementations of a virtualization layer are possible and within the scope of the disclosure. For example, the functions of Dom0, or a subset of the functions, as well as those affected by the hypervisor 102 can be integrated into a single component.

In accordance with an embodiment, the request 107 can be initiated by a data technician, monitoring service, application, customer, or other component in order to execute any privileged operation, such as reading a memory location of the hypervisor/kernel, modifying a section of code of the hypervisor/kernel or the like. The request can be signed and/or encrypted, as will be described with reference to FIGS. 2 and 3 below.

In accordance with an embodiment, the request 107 includes (e.g., as a parameter) a public key 104 that can be used to encrypt information as well as, for example, an identifier of the principle submitting the request and a digital signature. If the request is directed to the kernel 106, the kernel can execute the privileged operation to produce results and then encrypt the results 109 using the public key 104 included in the request. The results 109 are encrypted before they are communicated out of the kernel 106 and/or the host computing device 101. Similarly, if the request is directed to the hypervisor, the hypervisor can execute the privileged operation to produce the results and encrypt the results 110 using the public key 194 before the results leave the hypervisor.

In some embodiments, the request does not need to be bound to a particular host machine. In other embodiments, however, the request may be bound to a selected machine. In at least one embodiment, the request may be bound to a particular time window (e.g., a day, a week, etc.) and the service provider may employ a number of people that can issue the request to the various host machines during that time duration. Because the data is encrypted before it leaves the kernel or the hypervisor, or encrypted if it is stored in a persistent manner on the host computing device 101, the security scheme enables a data technician or other intermediary parties 112 (who may not be trustworthy) to issue very sensitive calls and collect highly sensitive information from the hypervisor/kernel and/or other secured components. Because the results of these requests are encrypted before they leave the kernel/hypervisor, the intermediary party 112 would not have access to the sensitive information that may be contained in those results. In various embodiments, all of the resulting data can be collected and stored securely, wherein only authenticated or trusted parties in a secure location 103 can decrypt this information by using a private key 111 that is securely maintained.

Figure 2:
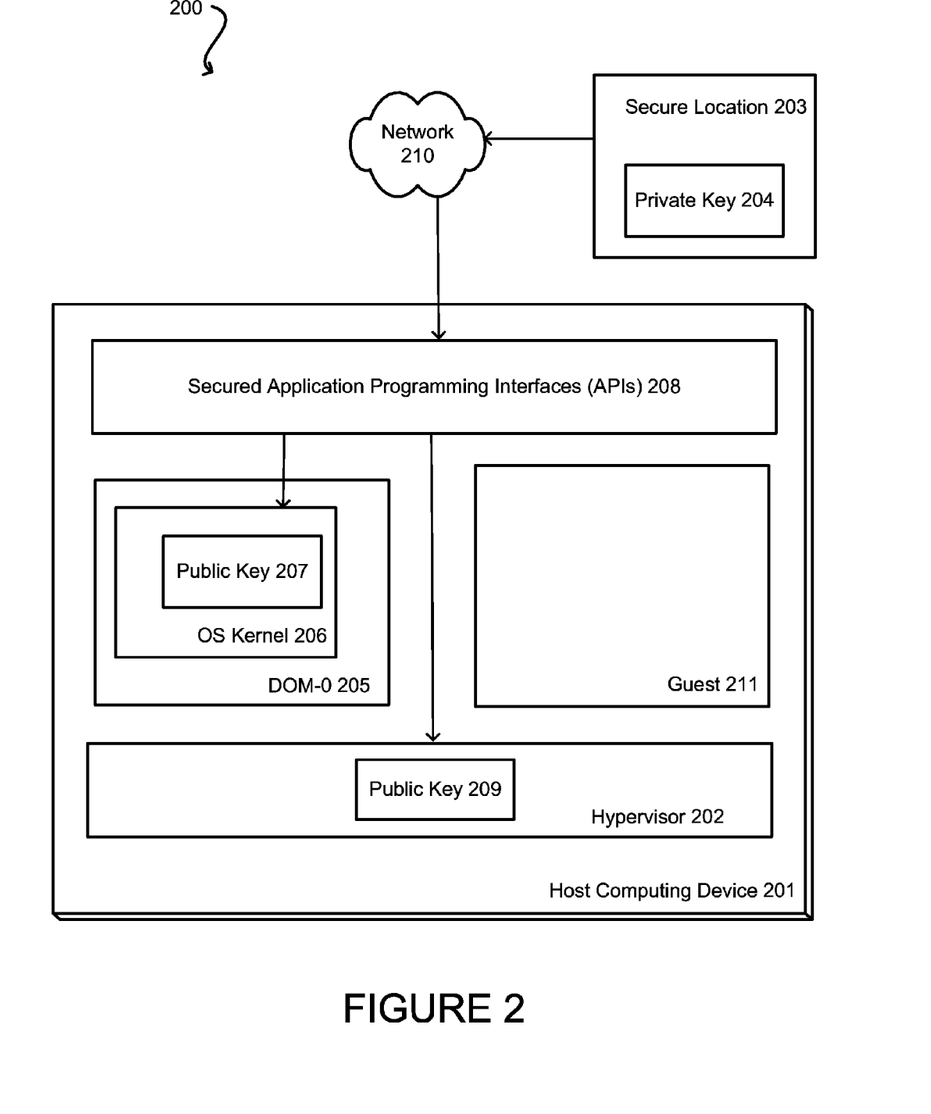
FIG. 2 illustrates an example of using asymmetric cryptography to encrypt the requests submitted to the kernel or hypervisor, in accordance with various embodiments.

FIG. 2 illustrates an example 200 of using asymmetric cryptography to sign requests submitted to the kernel or hypervisor, in accordance with various embodiments. In the illustrated embodiment, a host computing device 201 includes at least one virtualization layer (illustrated as a combination of a hypervisor 202 and Dom0 205) and one or more guests 211. The guests can be virtual machine instances, each having their own respective operating system (OS), kernel, device drivers, scheduler and the like.

In accordance with an embodiment, the host computing device 201 provides a set of APIs 208 that can be used to submit signed and/or encrypted requests to perform privileged operations on the kernel (e.g., Dom-0 kernel) or the hypervisor 202. The privileged operation can read a location in memory, or cause the hypervisor 202 and/or kernel 206 to generate one or more results. Because the API requests can be encrypted, intermediary parties outside of the kernel/hypervisor would not be able to read the encrypted request without possession of a private key and would not know what the request is intended to perform. In addition, the encrypted requests may include a public key that can be used to encrypt the results of the request before the results are transmitted out of the kernel/hypervisor.

In accordance with the illustrated embodiment, the requests of the API can be signed and verified using an asymmetric key pair that includes a private key and a public key. In one embodiment, at least some (or all) of the arguments to the API call (e.g., including the public key for encrypting the results) are canonicalized and serialized, resulting in a string-to-sign. This string can then be signed either via hash-based message authentication code (HMAC) or asymmetric cryptography, and sent to the API 208. Because the parameters to the API are included in the signature, a potential attacker who obtained the request (e.g., the code that made the request) would be unable to alter the request and would be unable to remove the public key from the request or replace it with another key.

In accordance with some embodiments, the request can contain a timestamp, providing time window based replay protection, where the request remains valid for only a limited duration of time. In some embodiments, the request can include a unique value that is specifically associated with the host computing device 201, such as a serial number or host machine identifier (ID). While these values may not be secret, including them can bind the request to a particular host computing device 201. In that case, a potential attacker would be prevented from replaying the request against a different host computing device. In some embodiments, the request can be authenticated by the trusted platform module (TPM) (not illustrated) in the host computing device 201 in order to increase the strength of the binding to the host computing device 201.

In accordance with the illustrated embodiment, the private key 204 used to sign the API requests is not present on the host computing device 201 to which the requests are addressed. Instead, the private key 204 can be stored in a secure location 203 on the network 202 of the service provider, or in another trusted location. As a result, if malicious agents were present on the host computing device 201, they would not be able to forge requests using the private key 204.

The host computing device 201 can include a public key that can be used to verify the signature of the requests which have been signed using the private key 204. In one embodiment, the public key 207 can be compiled into the kernel 206 of the host computing device 201. In another embodiment, the public key 209 can be compiled into the hypervisor 202. In some embodiments, the kernel 206 may store a different public key 207 than the public key 209 stored on the hypervisor 202, while, in other embodiments, the same public key may be used to verify requests on both the hypervisor 202 and the kernel 206. In yet other embodiments, rather than storing the actual public key on the host computing device 201, the host computing device 201 may instead be configured to trust any public key that is certified by a particular certificate authority (CA). In those embodiments, the host computing device 201 may receive the request from the requestor, where the request is accompanied by a certificate that includes the public key. The host computing device 201 would trust the certificate of the CA and therefore trust the public key received as part of the request. Regardless whether the public key is stored on the host computing device or provided along with a certificate, the public key can be used to verify an API request that was signed using the private key 204. For example, if a user (e.g., customer, technician of the service provider, third party, etc.) wanted to apply an update to some portion of code on the kernel 206, they can obtain access to the private key 204 and use the private key to sign the API request to modify the appropriate portions of code. Upon receiving the request, the kernel 206 can attempt to verify the request using the public key, and if verification is successful, execute the necessary privileged operations.

In alternative embodiments (not shown), if HMAC and symmetric keys were utilized, the private key may be compiled into the kernel 206 or the hypervisor 202. In that case, the private key could be obfuscated and changed with every build, but the key may actually be present on the host computing device 201. Optionally, the entire request could be encrypted to a key compiled into the kernel, such that the request itself is opaque to the code issuing it.

In some embodiments, one or more restrictions can be applied according to the particular key that has been provided with the request (or according to the party in possession of the key). For example, requests signed by some actors may only be allowed to start/stop guest virtual machines on the host computing device. Requests signed using a key held by other actors (e.g., OS team of the service provider) may be allowed to read the memory of a virtual machine or the hypervisor. In one embodiment, the host computing device 201 can have multiple different public keys stored thereon, where each public key is associated with a private key associated with a different entity (e.g., user, team, etc.) Depending on which entity's private key was used to sign the request, the requested operation may be allowed or denied. In an alternative embodiment, the host computing device 201 may store only one public key that is associated with one private key, however, the request can include the identity of the user submitting the request. Based on this identity, the host computing device 201 may apply different restrictions on the execution of the requested operation. For example, the host computing device 201 may allow one user to stop/start a guest, while another user may be allowed to modify or update code of the hypervisor. Any number of such restrictions (e.g., on a per-key or per-party basis) are possible and within the scope of the embodiments described herein.

Figure 3:
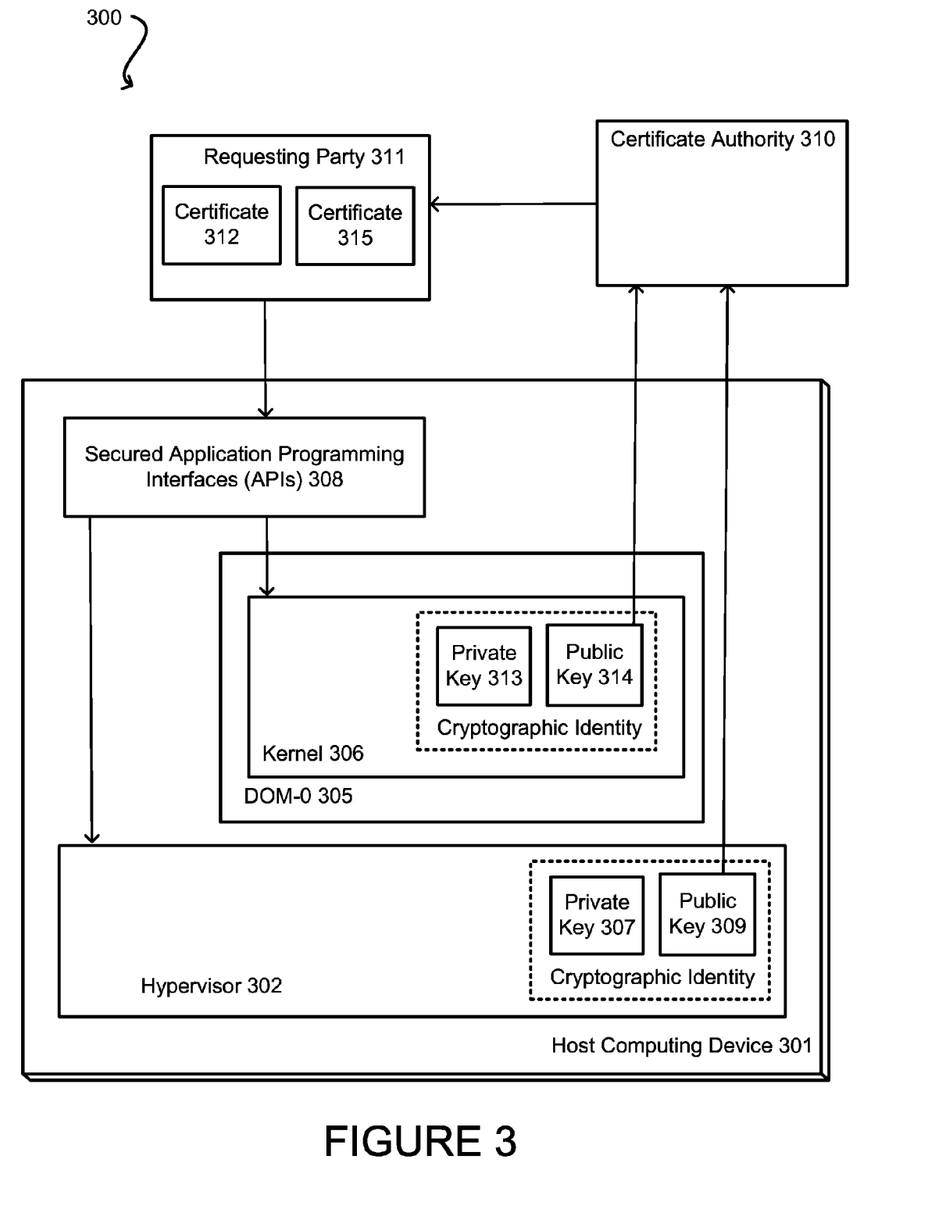
FIG. 3 illustrates an example of utilizing a certificate authority in accordance with various embodiments.

FIG. 3 illustrates an example 300 of utilizing a certificate authority in accordance with various embodiments. In the illustrated embodiment, the host computing device (e.g., the kernel 306 and/or the hypervisor 302 on the host computing device 301) generates a cryptographic identity comprised of an asymmetric key pair at boot time. For example, when the host computing device 301 is booting, the hypervisor 302 generates a key pair that includes a private key 307 and a public key 309. Similarly, when the Dom0 305 is loaded, the kernel 306 generates a key pair comprised of private key 313 and public key 314.

In various embodiments, the public keys (309, 313) can be published in some fashion. For example, the public keys can be provided to a certificate authority 310. Alternatively, the public key can be provided directly to the requesting party. This public key could be collected, and the request could be encrypted using this key. In this embodiment, the private keys (307, 314) that were generated by the host computing device 301 never leave the host computing device and do not exist anywhere else. If a requesting party can reliably get the public key from the host computing device 301, then it can guarantee that the request signed using the public key will be going to that host computing device 301 (and only that host computing device) because the request is signed by using a public key (309, 314) that can only be decrypted by the private key (307, 313) that never left the host computing device. It should be noted that although FIG. 3 illustrates an example where both the kernel 306 and the virtualization layer 302 issue their own respective key pairs, this is not a requirement or a limitation for all embodiments. In some embodiments, only the hypervisor issues a key pair. In other embodiments, only the kernel issues key pairs. Yet in other embodiments, the hypervisor and the kernel can share a key pair.

In some embodiments, the host computing device 301 can provide the public key 309 used for signing the request to a certificate authority (CA) 310. The CA 310 can be an entity that issues one or more digital certificates (312, 315) to appropriate requesting parties (e.g. signing party 311). The digital certificates certify that the party appropriately owns the public key that can be used to sign the API request. In this embodiment, the use of the CA enables the requesting party to believe, with a degree of certainty, that the private key is indeed for the host computing device 301. In one embodiment, the CA is a CA for the service provider and runs within the resource center of the service provider. The resource center is described in further detail with reference to FIG. 4 below. In another embodiment, the CA 310 is a trusted third party that is trusted by both the requesting party 311 and the host computing device 301 relying upon the certificate. Certificate authorities are well known in the art and are used in many public key infrastructure (PKI) schemes.

In this embodiment, once the CA 310 issues a certificate 312 to a requesting party 311, the requesting party 311 can use the certificate to make API requests to execute privileged operations in the context of the kernel 306 or hypervisor 302. The hypervisor 302 or kernel 306 can then verify that any certificate signed by a particular CA issued to a particular party is valid and can execute the privileged operation accordingly.

In some embodiments, the certificate authority 310 can also provide a certificate for a public key that will be used to sign the results of the request, as previously described. For example, when an employee of the service provider (e.g., a data technician) needs to submit a sensitive request to the kernel/hypervisor on a host computing device 301, the data technician can first obtain a certificate from the CA 310. This certificate could then be used to certify the ownership of the public key by the data technician. In a similar fashion, automated components, such as a monitoring service, can also utilize the CA 310 to obtain one or more certificates, as described herein.

It various embodiments, the techniques illustrated in FIG. 3 can be used in conjunction with the techniques illustrated in FIG. 2. For example, the requesting party 311 of FIG. 3 can have its own private key, which the requesting party can use to sign the request to execute a privileged operation. In this embodiment, the request is both signed to ensure authenticity (i.e. the host computing device would know with certainty that the requesting party generated the request), as well as encrypted to ensure privacy (i.e. no external parties could decipher the information contained in the request).

Figure 4:
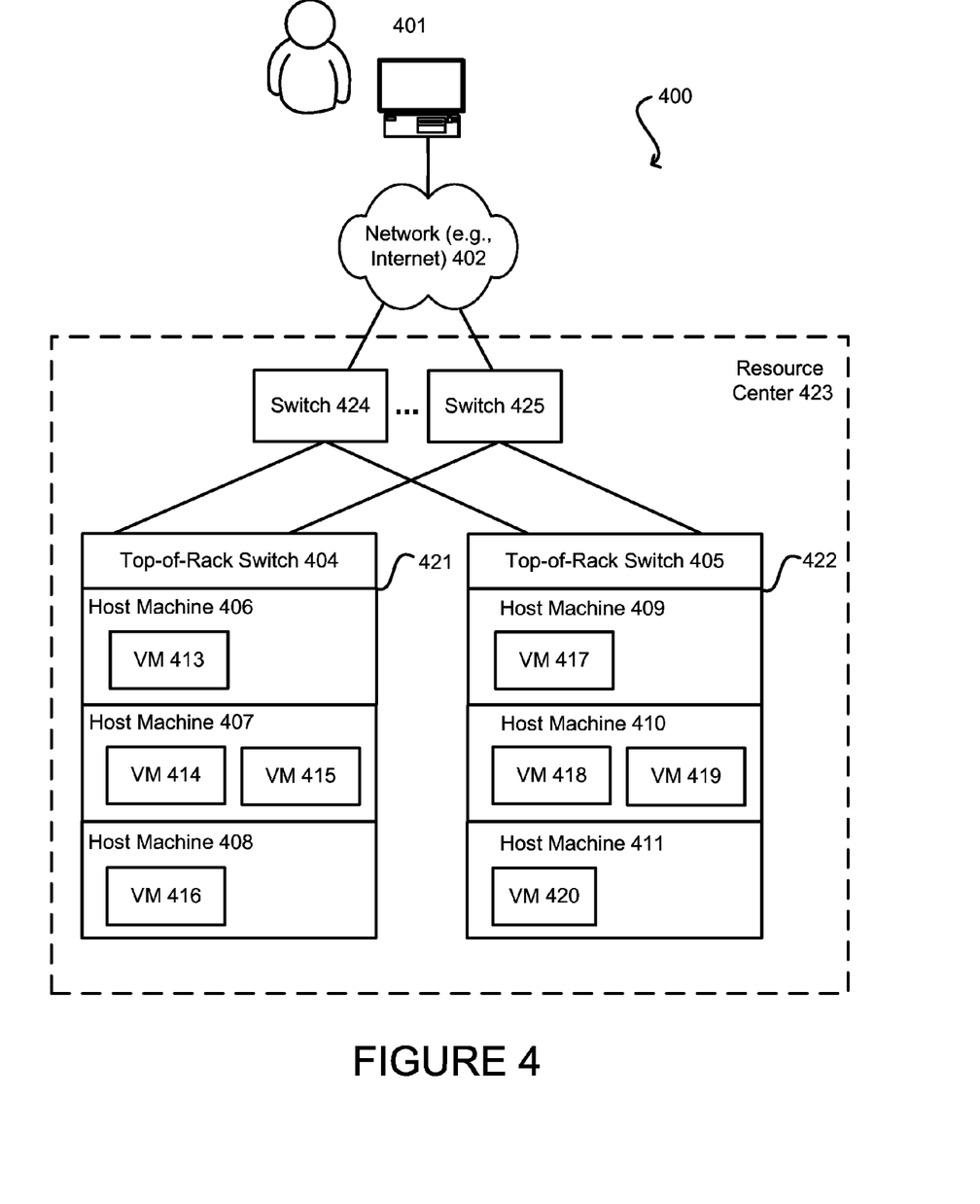
FIG. 4 illustrates an example of a resource center environment of the service provider, in accordance with various embodiments.

FIG. 4 illustrates an example 400 of a resource center environment of the service provider, in accordance with various embodiments. In the illustrated embodiment, a service provider (e.g., a cloud computing resource provider) can maintain one or more resource centers 423 (e.g., data centers, server farms, etc.) that store the physical resources (e.g., host servers, etc.) of the service provider. These physical resources can be used to host a number of virtual machine instances or virtual servers that can be provided to users 401 over a network 402, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like.

In the illustrated example, the resource center 423 of the service provider may include one or more racks 421, 422 of host computing devices (406, 407, 408, 409, 410) wherein each host computing device on a particular rack is connected to a single top-of-rack (TOR) switch (404, 405). These TOR switches can be further connected to one or more other switches (424, 425) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (413, 414, 415, 416, 417, 418, 419) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. The service provider may carry out the processes to provision the virtual machine instance which will be hosted on the physical resources (e.g., host computing devices) of the service provider. The virtual machine instance can then be used to execute the various applications and services on behalf of the customer, utilizing the resources of the service provider.

In accordance with an embodiment, once the virtual machine instance is up and running, a modification may need to be applied the code of the hypervisor or the kernel of the VM. For example, the service provider may wish to apply a patch or update to the code of the hypervisor hosting the VMs on the host machine. Alternatively, the customer (or some other third party) may wish to apply an update to the code of the kernel of the VM. In various embodiments, the APIs described throughout this disclosure enable a user to modify the code in a secure fashion by utilizing asymmetric (or symmetric) cryptography. Additionally, the results of such API requests can be encrypted before the results are communicated outside of the kernel/hypervisor by using the security schemed described herein.

Figure 5:
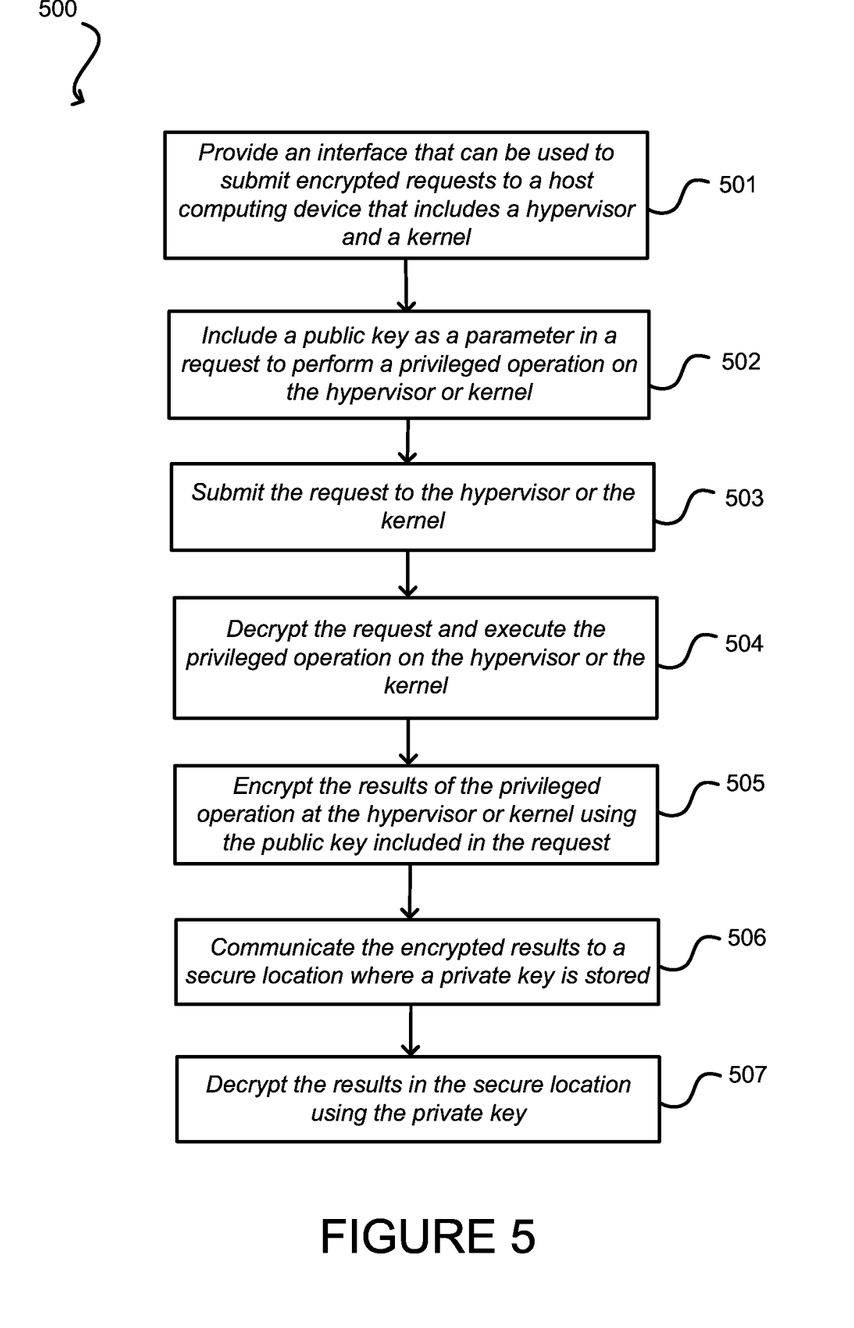
FIG. 5 illustrates an example process for securing the results of the request to execute a privileged operation in the hypervisor or the kernel, in accordance with various embodiments.

FIG. 5 illustrates an example process 500 for securing the results of the request to execute a privileged operation in the hypervisor or the kernel, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, an interface (e.g., API) is provided by a host computing device. The interface can be used to submit signed and/or encrypted requests to the host computing device that may include secured components, such as a hypervisor and one or more virtual machine instances having kernels.

In operation 502, a public key is included as a parameter in a request (e.g., API request) to perform a privileged operation on the hypervisor and/or kernel. The public key will be used to encrypt the results of the request. In some embodiments the request may itself be encrypted. In those embodiments where the entire request is encrypted, the key can be different than the public key used to encrypt the actual request. In other embodiments, the key can be the same key as the key used to encrypt the request. In either case, the key included in the request can be used to encrypt the results of the privileged operation executed by the kernel/hypervisor.

In operation 503, the request, having the key included as a parameter, is submitted to the hypervisor or the kernel on the host computing device. In operation 504, the hypervisor and/or the kernel can decrypt the request and execute the privileged operation to produce a set of results on the host computing device. For example, in an embodiment where the API is a web-services API, a web server running on the host computing device, e.g., within the virtualization layer, can receive the API call, which in this specific example is a web-service API call. The web server can authenticate the request and invoke the privileged operation.

In operation 505, the results produced by the kernel/hypervisor are encrypted using the public key included in the request before the results are communicated outside of the kernel/hypervisor. For example, before the results are provided to the data technician or a monitoring service, the results are encrypted, thereby preventing the data technician or monitoring service from reading the results of the request, unless they have access to the correct private key.

In operation 506, the results are delivered to a secured location, such as a remote network location on an internal network of the service provider. In accordance with an embodiment, the secured location stores a private key that can be used to decrypt the results that were encrypted using the public key. In operation 507, the results are decrypted by an authenticated party, using the private key.

It should be noted that although the request is encrypted in FIG. 5, this is not a limitation to all of the embodiments described herein. In some alternative embodiments, the request may only be signed using a private key of the authorized entity. In these embodiments, the public key included in the request is part of the signature associated with the request and therefore cannot be removed by an unauthorized entity. In other embodiments, the request is not signed or encrypted.

Figure 6:
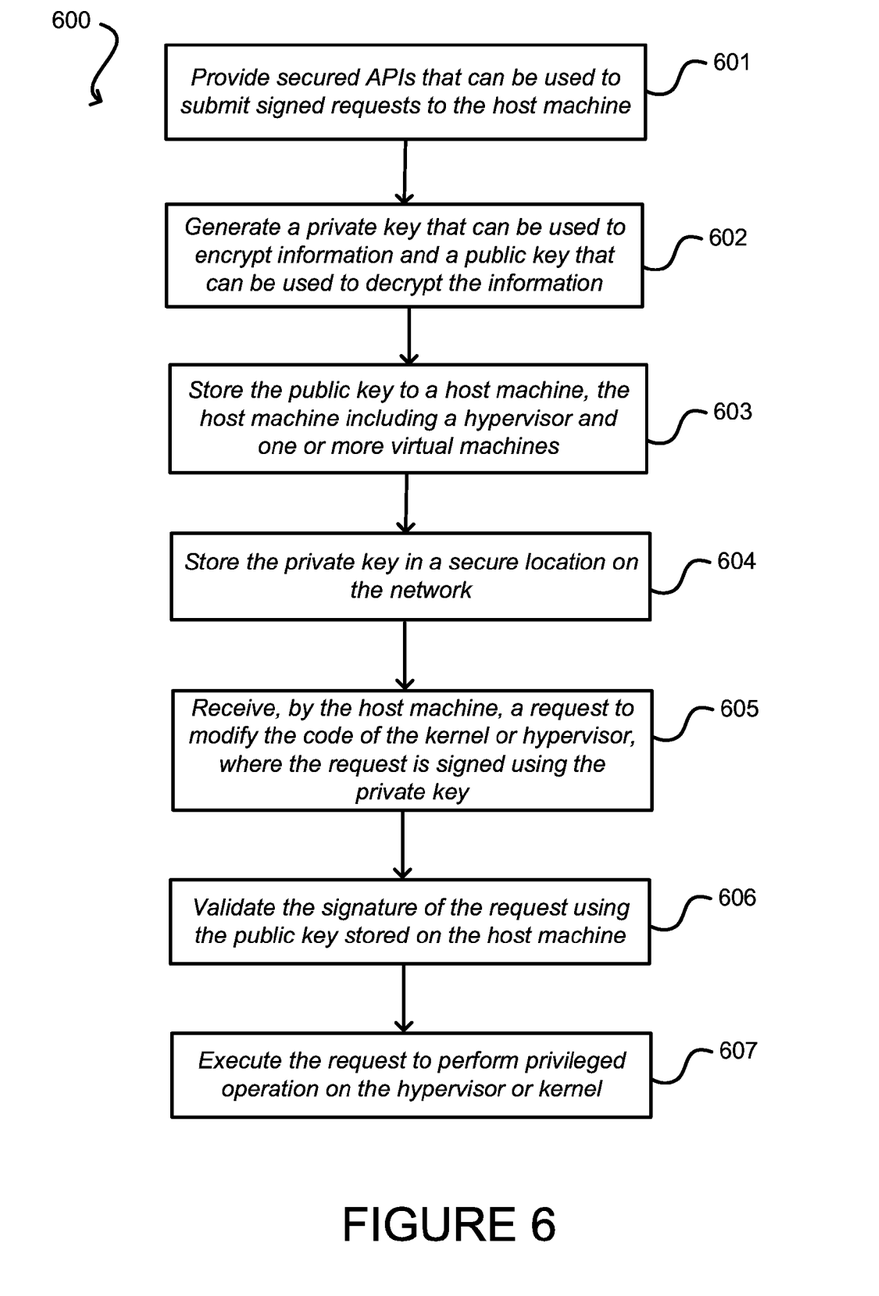
FIG. 6 illustrates an example process for providing APIs that can be used to perform privileged operations in a hypervisor or kernel, in accordance with various embodiments.

FIG. 6 illustrates an example process 600 for providing APIs that can be used to perform privileged operations in a hypervisor or kernel, in accordance with various embodiments.

In operation 601, one or more application programming interfaces (APIs) are provided, which can be used to submit signed requests to a host computing device. The host computing device can include a virtualization layer (e.g., a Virtual machine monitor or a Dom0 operating in conjunction with hypervisor) and one or more guests (e.g., virtual machines running guest operating systems having operating system kernels).

In operation 602, an asymmetric key pair is generated, including a private key and a corresponding public key. The private key can be used to encrypt information and the public key can be used to decrypt the information encrypted using the private key.

In operation, 603, the public key is stored on the host computing device. For example, the public key can be compiled into the kernel of the operating system or into the hypervisor. Alternatively, the key can be stored in the trusted platform module (TPM) of the host computing device.

In operation 604, the private key is stored in a secure location that is external with respect to the host computing device. In this embodiment, the private key is not present on the host computing device, such that any malicious agent residing thereon would not have access to the private key.

In operation 605, the host computing device receives a request over the API, requesting to execute a privileged operation on the hypervisor and/or the operating system kernel. In accordance with an embodiment, the received request is signed using the private key.

In operation 606, the host computing device (e.g., kernel or hypervisor) attempts to validate the signature of the request using the public key stored on the host computing device. If the signature of the request is successfully validated, the privileged operation can be executed on the hypervisor/kernel, as shown in operation 607. If the signature cannot be successfully validated using the public key, the privileged operation fails (i.e. is not executed).

Figure 7:
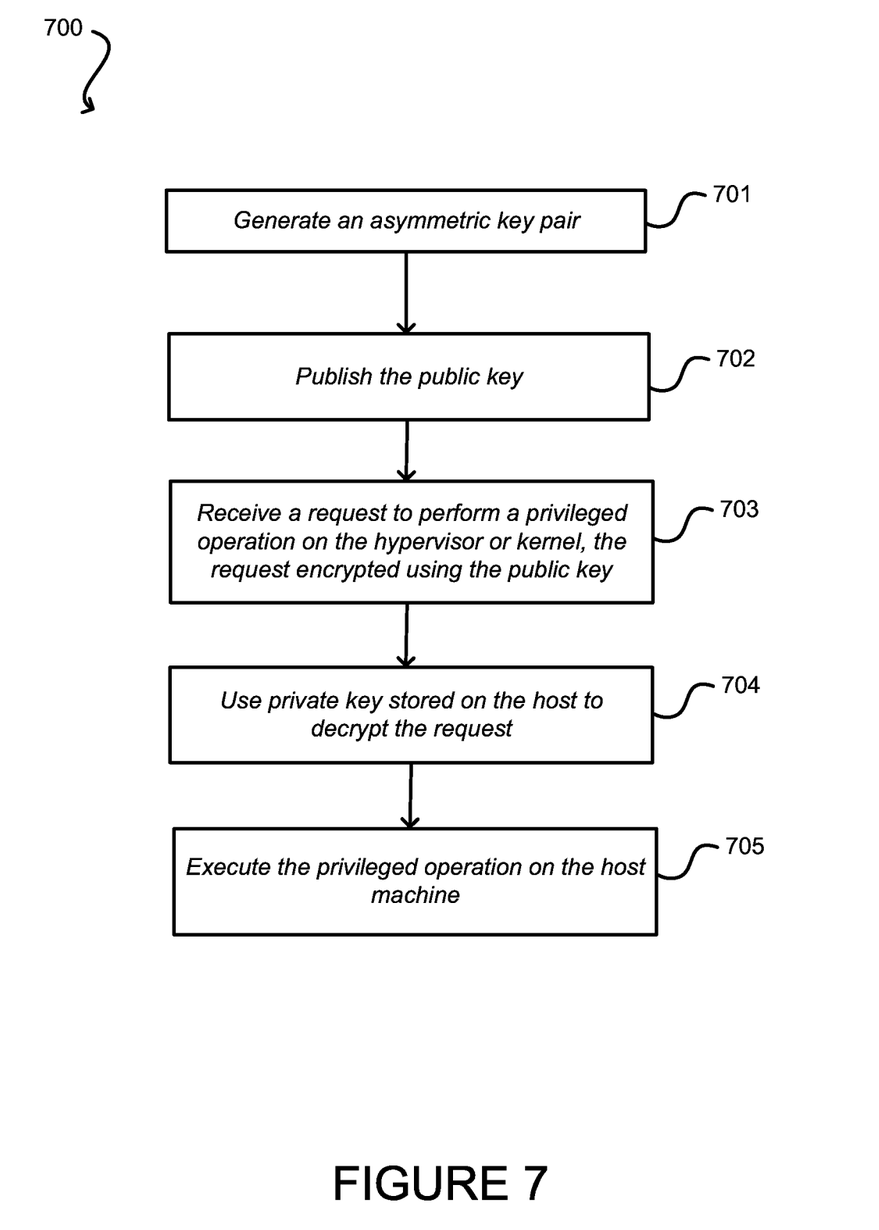
FIG. 7 illustrates an example process of for utilizing encryption of requests, in accordance with various embodiments.

FIG. 7 illustrates an example process 700 for utilizing encryption of requests, in accordance with various embodiments. In operation 701, the host computing device generates an asymmetric key pair. For example, a boot process on the host computing device may generate a public key and a corresponding private key. In operation 702, the public key is published to a trusted source. In one embodiment, the public key can be provided directly to the requesting party that will use the public key to encrypt requests. In another embodiment, the public key can be provided to a certificate authority, where the certificate authority may grant certificates to authenticated parties that may wish to perform privileged operations on the kernel or hypervisor. In this embodiment, the certificate authority can embed the public key in the certificate and sign the certificate using its own private key. Thus, parties that receive the certificate can verify that the public key is indeed certified by the CA to be from the host computing device.

In operation 703, the host computing device receives a request to perform a privileged operation. The host computing device then attempts to decrypt the request using the private key stored on the host computing device, as shown in operation 704. If the request can be decrypted by using the private key, the host computing device can execute the privileged operation on the kernel/hypervisor, as shown in operation 705.

Figure 8:
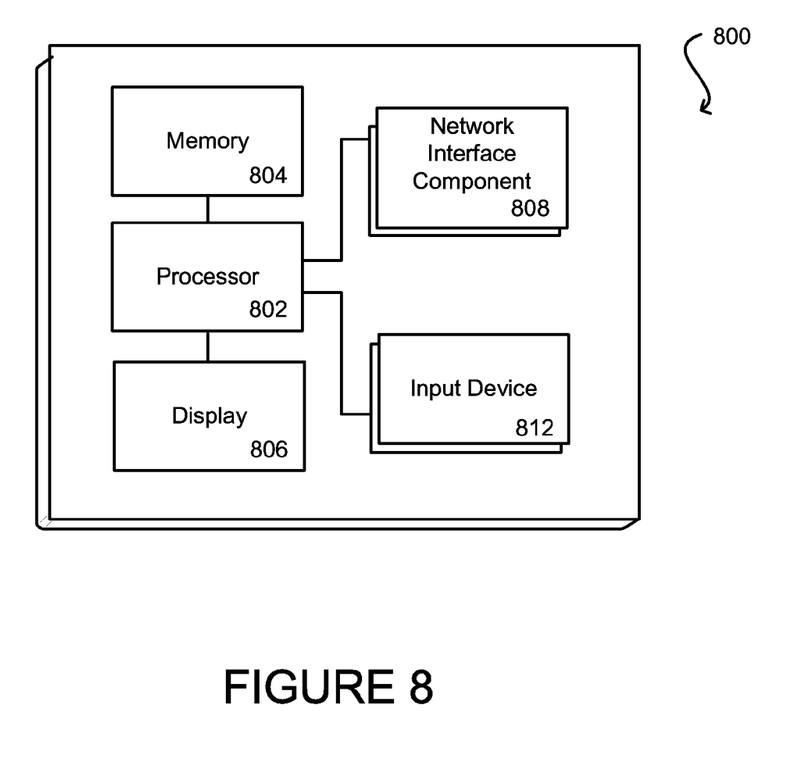
FIG. 8 illustrates a logical arrangement of a set of general components of an example computing device that can be utilized in accordance with various embodiments.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet, and may be able to communicate with other such devices.

Figure 9:
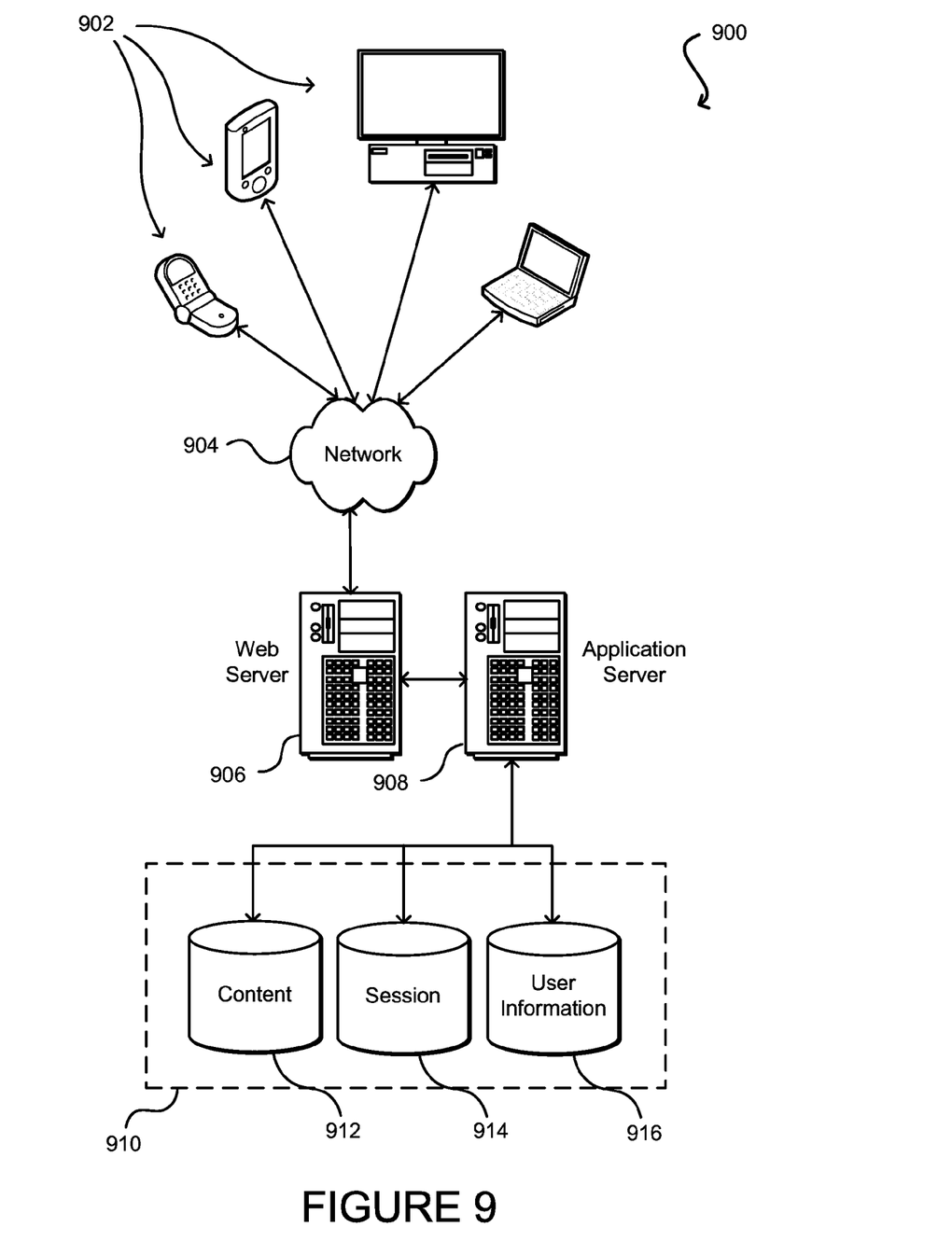
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for securing data in a virtualized computing environment, said method comprising:
   providing an interface to receive application programming interface (API) requests on a host computing device, the host computing device including at least one of: a hypervisor or a kernel;
   receiving, by the host computing device, a request to perform a privileged operation on the hypervisor or the kernel, the request being encrypted using a first key, the request including a second key as a parameter with the request, wherein the second key is used to at least encrypt information by the hypervisor or the kernel;
   wherein the hypervisor or the kernel is configured to decrypt the request and execute the privileged operation to produce a set of results on the host computing device, the set of results comprising hypervisor or kernel information including abnormal state information;
   encrypting, by the hypervisor or the kernel, the set of results by using the second key provided with the request, the set of results encrypted before the set of results are communicated out of the hypervisor or the kernel to an external location; and
   communicating the set of results encrypted with the second key to a location that is external with respect to the host computing device, wherein the set of results is decrypted using a private key.

2. The computer implemented method of claim 1, wherein the request is issued by a monitoring service configured to monitor a plurality of host computing devices, each host computing device including a hypervisor that manages one or more virtual machine instances.

3. The computer implemented method of claim 1, wherein the privileged operation includes:
   reading a location in memory on the host computing device, the location associated with the at least one of: the virtual machine manager or the kernel.

4. The computer implemented method of claim 1, wherein the abnormal state information comprises latent failure information.

5. A computer implemented method, comprising:
   generating a request to perform a privileged operation on a virtualization layer of a host computing device;
   obtaining a public key and including the public key in the request, the public key used to at least encrypt information by the virtualization layer, the public key having a corresponding private key that is used to at least decrypt the information encrypted using the public key by the virtualization layer, wherein the request to perform the privileged operation is encrypted using a second key;
   submitting the request including the public key to the virtualization layer of the host computing device, the virtualization layer configured to execute the privileged operation to produce a result; and
   wherein the virtualization layer is configured to decrypt the request to perform the privileged operation and encrypt the result of the privileged operation by using the public key provided with the request, and wherein the virtualization layer is configured to encrypt the result before the result is communicated out of a hypervisor or a kernel of the virtualization layer of the host computing device, the result comprising hypervisor or kernel information including abnormal state information.

6. The computer implemented method of claim 5, wherein the virtualization layer is configured to communicate the encrypted result to a location that is external with respect to the host computing device; and wherein the encrypted result is decrypted at the location by using a private key.

7. The computer implemented method of claim 5, wherein the request to perform the privileged operation is signed using a service private key, and wherein a signature of the request is verifiable by the virtualization layer using a service public key.

8. The computer implemented method of claim 7, further comprising:
   obtaining a certificate including the service public key from a certificate authority (CA).

9. The computer implemented method of claim 5, wherein obtaining the public key further includes:
   obtaining, using a certificate authority (CA), at least one certificate that certifies ownership of the public key.

10. The computer implemented method of claim 5, wherein the request is generated by a monitoring service that monitors a plurality of host computing devices.

11. The computer implemented method of claim 10, further comprising:
   detecting, by the monitoring service, that at least one of the plurality of host computing devices is operating abnormally based at least in part on a profile associated with the at least one of the plurality of host computing devices.

12. The computer implemented method of claim 5, wherein the request is bound to a specified time duration.

13. The computer implemented method of claim 5, wherein the privileged operation modifies a running memory image of the virtualization layer on the host computing device.

14. The computer implemented method of claim 5, wherein the privileged operation further includes:
reading a location in memory on the host computing device, the location associated with the virtualization layer.

15. The computer implemented method of claim 5, wherein the abnormal state information comprises latent failure information.

16. A system, comprising:
a first computer system including at least one processor; and
memory including instructions that, when executed by the at least one processor, cause the computing system to:
receive, from a trusted party, a request to perform a privileged operation on a virtualization layer of a host computing device, the request including a public key, the public key being used to at least encrypt information by the virtualization layer, the public key having a corresponding private key that is used to at least decrypt the information encrypted using the public key by the virtualization layer, wherein the request to perform the privileged operation is encrypted using a second key; and
issue the request to an application programming interface (API) of the host computing device, wherein the virtualization layer is configured to decrypt the request, execute the privileged operation to produce a result, and encrypt the result using the public key provided with the request,
wherein the host computing device includes at least one processor and memory including instructions that, when executed cause the host computing device to:
execute the privileged operation;
encrypt the result within the virtualization layer before the result is communicated out of a hypervisor or a kernel of the virtualization layer using the public key provided with the request, the result comprising hypervisor or kernel information including abnormal state information; and
store the encrypted result in a predetermined location.

17. The computing system of claim 16, wherein the abnormal state information comprises latent failure information.

18. A computing system, comprising:
at least one processor; and
memory including instructions that, when executed by the at least one processor, cause the computing system to:
receive a request to perform a privileged operation on a virtualization layer of a host computing device, the request including a public key, the public key used to at least encrypt information by the virtualization layer, the public key having a corresponding private key that is used to at least decrypt the information encrypted using the public key;
execute the request in the virtualization layer of the host computing device to produce a result;
cause the result of the privileged operation to be encrypted by using the public key provided with the request within the virtualization layer before the result is communicated out of a hypervisor or a kernel of the virtualization layer, the result comprising hypervisor or kernel information including abnormal state information; and
communicate the encrypted result to a location that is external with respect to the host computing device, the location storing the private key, and wherein the encrypted result is decrypted using the private key.

19. The computing system of claim 18, wherein the request to perform the privileged operation is encrypted using a second key, and wherein the request is decrypted by the virtualization layer.

20. A non-transitory computer readable storage medium storing one or more sequences of instructions executable by one or more processors to:
receive a request to perform a privileged operation on a virtualization layer of a host computing device, the request including a public key, the public key being used to at least encrypt information by the virtualization layer, the public key having a corresponding private key that is used to at least decrypt the information encrypted using the public key;
execute the request in the virtualization layer of the host computing device to produce a result;
cause the result of the privileged operation to be encrypted by using the public key provided with the request, wherein the result is encrypted at the virtualization layer before the result is communicated from a hypervisor or a kernel of the virtualization layer of the host computing device to an external location, the result comprising hypervisor or kernel information including abnormal state information; and
communicate the encrypted result to a location that is external with respect to the host computing device, the location storing the private key, wherein the result is decrypted at the location using the private key.

21. The non-transitory computer readable storage medium of claim 20, wherein the request to perform the privileged operation is encrypted using a second key, and wherein the request is decrypted by the virtualization layer.

* * * * *